United States Patent [19]
Brescia et al.

[11] Patent Number: 5,869,121
[45] Date of Patent: Feb. 9, 1999

[54] MOISTURE-REDUCED, FORMULATED FOOD PRODUCT

[75] Inventors: Lorenzo Brescia; Dan Dixon, both of St. Joseph, Mo.

[73] Assignee: Nestec S.A., Vevey, Switzerland

[21] Appl. No.: 17,180

[22] Filed: Feb. 2, 1998

[51] Int. Cl.$^6$ .................................. A23L 1/31; A23L 1/05
[52] U.S. Cl. ......................... 426/281; 426/302; 426/574; 426/578; 426/514; 426/517; 426/518; 426/519; 426/520
[58] Field of Search ...................... 426/281, 302, 426/310, 573, 574, 578, 514, 517, 516, 518, 519, 520

[56] References Cited

U.S. PATENT DOCUMENTS

| | | | |
|---|---|---|---|
| 3,898,345 | 8/1975 | Horrocks et al. | 426/274 |
| 4,039,692 | 8/1977 | Clausen | 426/532 |
| 4,054,674 | 10/1977 | Barker et al. | 426/326 |
| 4,284,652 | 8/1981 | Christensen | 426/72 |
| 4,330,562 | 5/1982 | Nassar | 426/310 |
| 4,384,009 | 5/1983 | Lewis et al. | 426/646 |
| 4,436,759 | 3/1984 | Trilling et al. | 426/573 |
| 4,781,939 | 11/1988 | Martin et al. | 426/646 |
| 5,045,339 | 9/1991 | Ducharme | 426/641 |
| 5,132,137 | 7/1992 | Reimann et al. | 426/513 |
| 5,397,587 | 3/1995 | Thompson et al. | 426/557 |

FOREIGN PATENT DOCUMENTS

| | | |
|---|---|---|
| 0 038 603 | 10/1981 | European Pat. Off. . |
| 2 237 497 | 5/1991 | United Kingdom . |

*Primary Examiner*—Nina Bhat
*Attorney, Agent, or Firm*—Hill & Simpson

[57] ABSTRACT

A moisture-reduced, formulated food product which has a soft, resilient texture and which simulates the appearance of cooked meat. The food product has a fried body which is formed of layers of a thermally gelled matrix containing protein and starch. The formulated food product is particularly suitable for use as a pet food. The formulated food product may be fed to pets as a meal or as a treat. Alternatively, the formulated food product may be combined with dried pellets to provide a nutritionally balanced meal.

20 Claims, No Drawings

MOISTURE-REDUCED, FORMULATED FOOD PRODUCT

FIELD OF THE INVENTION

This invention relates to a nutritionally balanced pet food containing dried food pieces and a moisture-reduced food product which has a soft texture and which simulates the appearance of meat. The invention also relates to the moisture-reduced food product and to a process of producing the moisture-reduced, food product.

BACKGROUND OF THE INVENTION

Most pet foods are either in the form of dried pellets or in the form of canned gelled products. The dried pellets are usually produced by combining various protein and starch sources, extruding the mixture, and drying the extrudate in an oven. The extrudate may be coated with various flavor substances to improve palatability. The end result is a hard, dry pellet. The pellets may be fed to the animals in this form or may be mixed with other foods such as canned gelled products.

The dried pellets are commonly used by pet owners since they form a convenient, easy-to-use food. Further the dried pellets are relatively inexpensive and have a long shelf life. However, while the palatability of dried pellets is often good, it is often less than that of canned gelled products. Also, all the dried pellets have the same texture which may lead to taste fatigue, or at least a perceived fatigue, on the part of the pet. Consequently, to further improve palatability and avoid fatigue, pet owners often mix canned gelled products into the dried pellets.

However, it would be advantageous to provide a pet food product which, being moisture-reduced, is convenient and easy-to-use but which has an appearance and texture more similar to cooked meat than dried pellets.

SUMMARY OF THE INVENTION

In one aspect, this invention provides a moisture-reduced formulated food product comprising a fried body formed of layers of a thermally gelled matrix containing protein and starch.

The moisture-reduced, formulated food product has the advantage of having a texture and appearance similar to that of cooked meat despite having a moisture content less than about 20% by weight. Therefore the moisture-reduced, formulated food product has the convenience of use of a dried product but with a texture and appearance different than that of dried pellets. Further, the moisture-reduced, formulated food product has much improved palatability over dried pellets of similar composition.

In a further aspect, this invention provides a pet food comprising:

dried pieces of a thermally gelled matrix of a starch source and a protein source; and pieces of a moisture-reduced, formulated food product, the product comprising a body formed of a thermally gelled matrix containing protein, starch and a water-activity controlling agent, the body having a moisture content of less than 16% by weight and a water activity of less than 0.9.

Preferably the water-activity controlling agent is a humectant, a sugar, salt, or mixtures thereof. Further, the body is preferably made up of layers of the thermally gelled matrix.

In another aspect, this invention provides a process for producing a moisture-reduced, formulated food product, the process comprising:

thermally gelling a protein source and a starch source for providing a thermally gelled matrix;

forming the thermally gelled matrix into pieces; and frying the pieces for providing the moisture-reduced, formulated food product.

Preferably the process further comprises forming the thermally gelled matrix into a layered, gelled matrix prior to forming the matrix into pieces. This may be accomplished by heating the protein source and the starch source using mechanical energy in an emulsion mill and ejecting the heated mixture from the emulsion mill into a holding tube.

The process may also comprise incorporating a water-activity controlling agent into the thermally gelled matrix, or a water-activity controlling agent onto the moisture-reduced, formulated food product, or both.

DETAILED DESCRIPTION OF PREFERRED EMBODIMENTS OF THE INVENTION

Embodiments of the invention are now described, by way of example only.

The moisture-reduced, formulated food product is produced from a thermally gellable mixture of a protein source and a starch source. Any suitable protein and starch sources may be used. The choice of the starch and protein sources will be largely determined by nutritional needs, palatability considerations, and the type of food produced.

The protein source may be a vegetable protein source, an animal protein source, or a mixture of these protein sources. Suitable vegetable protein sources are gluten, wheat protein, soy protein, rice protein, corn protein, and the like. These proteins may be provided in the form of flours, concentrates and isolates as desired. Suitable animal protein sources are muscular or skeletal meat of mammals, poultry, and fish; meals such as meat meal, bone meal, fish meal, and poultry meal; by-products such as hearts, liver, kidneys, tongue and the like; and milk proteins.

The starch source is conveniently a grain such as corn, rice, wheat, barley, oats, or soy, and mixtures of these grains. The grain is conveniently provided in the form of a flour. Pure or substantially pure starches may also be used if desired. If flours are used, they will also provide some protein. Hence it is possible to use a material which is both a protein source and a starch source.

Various other ingredients, for example, salt, spices, seasonings, vitamins, minerals, flavoring agents, lipids and the like may also be incorporated into the thermally gellable mixture as desired. If added, the lipids may be any suitable animal fats; for example tallow, or may be vegetable fats.

If desired, a water-activity controlling agent may be added to the protein and starch sources; preferably to provide a final product with a water activity of less than about 0.9. The addition of the water-activity controlling agent provides the advantage of softening the texture of the final product and making it more meat-like. Also, the agent provides the product with a measure of protection against microbial infection. Any suitable water-activity controlling agent may be used. Suitable examples include humectants, salts and sugars. Humectants may, for example, be selected from corn syrup, glycerin, propylene glycol, butylene glycol, polyhydric glycols such as glycerol and sorbitol. Suitable sugars include invert sugar, and sucrose. Suitable salts include NaCl and sodium pyrophosphates.

The moisture-reduced, formulated food product is produced by forming a thermally gelled matrix, forming the matrix into pieces, and then frying the pieces to reduce their moisture content and to texturize them. The thermally gelled matrix may be produced in many different ways as desired.

For example, a thermally gellable mixture may be prepared from water and all the ingredients which make up the moisture-reduced, formulated food product. The thermally gellable mixture is then heated and formed into layers. This may be done as described in U.S. Pat. Nos. 4,781,939 and 5,132,137; the disclosures of which are incorporated by reference. As described in these patents, the thermally gellable mixture is fed to an emulsion mill in which the mixture is subjected to rapid mechanical heating and shearing. Any suitable emulsion mill may be used, for example the emulsion mill disclosed in U.S. Pat. No. 5,132,137. Other suitable emulsion mills are commercially available under the trade name of Trigonal and may be obtained from Siefer Machinenfabrik GmbH & Co KG, Bahnhofstrasse 114, Postfach 101008, Velbert 1, Germany.

In the emulsion mill, the temperature of the mixture is raised to the desired gelling temperature within a very short time; usually less than one or two seconds. Preferably the temperature is raised to about 100° C. to about 120° C. Alternatively, the temperature may be raised to in the range of about 45° C. to about 75° C. as described in U.S. Pat. No. 5,132,137. Usually the mechanical energy generated in the emulsion mill will be sufficient to heat the mixture to the desired temperature but this may be supplemented by the-injection of superheated steam.

The heated mixture is ejected from the emulsion mill in a thin stream into a holding tube. Because the heat mixture enters the holding tube in a thin stream, it forms thin layers upon heated mixture already in the holding tube. The layered, heated mixture in the holding tube then gels while moving slowly along the holding tube. Each layer of the layered, heated mixture remains substantially, visually distinct. The residence time of the heated mixture in the holding tube is sufficient for the mixture to gel into a firm gelled, product upon reaching the exit of the holding tube. At this stage, the gelled product has the highly striated appearance and the texture of meat.

In another example, the thermally gelled matrix may be produced by emulsifying water and the ingredients which make up the moisture-reduced, formulated food product. A high speed emulsifier or homogenizer is particularly suitable for emulsification. If necessary or desired, a gelling agent may be added. The emulsion is then heated to thermally gel the emulsion to provide a thermally gelled matrix; for example in a mixer-cooker or extruder. The thermally gelled matrix may then be forced through an orifice such as an extrusion die to provide a gelled product suitable for cutting into pieces.

The gelled product obtained from the process used is then cut into pieces in a suitable cutter. The pieces are preferably of a size suitable for use in a pet food; for example of dimension of about 10 mm. The pieces may then be screened to remove fines.

The pieces are then fried to dry them. This is conveniently carried out in a deep fat frying apparatus. Any suitable deep fat frying apparatus may be used. The fat used to fry the pieces may be any suitable animal or vegetable fat or oil. Suitable vegetable oils are peanut oil, corn oil, cottonseed oil, sunflower oil, hydrogenated soybean oil and the like. Beef tallow is a suitable animal oil. The temperature of the oil is preferably in the range of about 110° C. to about 205° C.; for example about 160° C. to about 180° C.

The pieces are fried for a time sufficient to dried them to a moisture content of less than about 20% by weight; for example about 5% to about 16% by weight. Depending upon the temperature of the oil, the time may vary between about 1 minute to about 5 minutes; for example about 2 minutes to about 4 minutes. The specific time and temperature needed for any particular product may be rapidly determined by a skilled person.

It is surprisingly found that the fried pieces produced from layered pieces retain the expanded, layered structure of the unfried, layered pieces. Normally, when these layered pieces are dried using conventional techniques, the pieces shrink. This diminishes the meat-like appearance. However, by frying, this problem is surprisingly avoided.

The fried pieces may then be drained and cooled; for example to about 15° C. to about 35° C. If necessary, the fried pieces may be coated with a water activity controlling agent, such as a salt, sugar or humectant, to reduce their water activity to below about 0.9; for example to about 0.4 to about 0.8. This provides the fried pieces with protection against bacterial, mold and yeast infestation. Also, the coated pieces become softer and have a better meat-like appearance. Any suitable humectants may be used; for example corn syrup, glycerin, propylene glycol, butylene glycol, polyhydric glycols such as glycerol and sorbitol, and the like. Suitable sugars are invert sugar and sucrose. Other softening or anti-microbial agents such as fermented protein, hydrolyzed protein, and the like may also be included. Preservatives may also be included in the coating as desired.

The fried pieces may also be coated with flavoring agents. Suitable flavoring agents include digests of animal matter, amino acids such as glycine, fats such as tallow, and the like.

The fried pieces may then be packed into suitable packaging; for example packaging normally utilized for dried pellets. In this form, the fried pieces may be fed to pets as a meal, part of a meal, or as a treat. Alternatively, the fried pieces may be mixed with dried pellets and then packed into suitable packaging. In this case, the water activity of the fried pieces is preferably similar to the water activity of the dried pellets. The water activities of the fried pieces and dried pellets will equilibrate in the package; conveniently to about 0.4 to about 0.8. The combination is particularly suitable as a nutritionally balanced meal for pets. The combination preferably comprises about 10% to about 50% by weight of dried pellets and about 90% to about 50% by weight of fried pieces.

The fried pieces preferably comprise about 5% to about 20% by weight of starch; about 30% to about 50% by weight of protein; about 20% to about 35% by weight of lipid; and about 5% to about 16% by weight of moisture. If additional ingredients such as salts, sugars, spices, seasonings, flavoring agents, minerals, and the like are included in the fried pieces, these additional ingredients preferably make up about 0.5% to about 15% by weight of the fried pieces.

It will be appreciated that numerous modifications and variations may be made to the embodiments described above without departing from the invention. Further, while the moisture-reduced, formulated food product is particularly suitable for use as a pet food, it may be used as a human food. Of course, the particular flavors used will differ depending upon whether humans or animals consume the food product. Also human grade ingredients should be used.

EXAMPLE 1

A thermally gellable mixture is prepared from wheat gluten, de-fatted soy flour, sugars, tallow, and water. The thermally gellable mixture is run through an emulsion mill (a Trigonal Mill obtained from Siefer Machinenfabrik GmbH & Co KG). The heated mixture leaves the emulsion mill at a temperature of 103° to 115° C. and is discharged into a holding tube. The residence time in the holding tube is less than 6 minutes. The gelled product leaving the holding tube is cut into pieces of about 10 mm size. The pieces have a striated, meat-like appearance.

The pieces are sieved to remove fines. The moisture content of the pieces is about 55% by weight. The pieces are then transferred to a deep fat, batch fryer in which they are fried in beef tallow at a temperature of about 177° C. for about 3 minutes. The pieces are then removed, allowed to drain in frying baskets, and cooled to ambient temperature. The fried pieces retain the striated, meat-like appearance.

The fried pieces are then transferred to a coating apparatus. A mixture of glycerol, hydrogenated corn syrup and flavoring agents are then coated on the pieces over a time of about 1.5 minutes. The coated pieces have a moisture content of about 8% by weight and a water activity of about 0.65. The coated pieces have a soft, resilient texture totally unlike dried pellets. Further, the coated pieces have a striated, meat-like appearance.

EXAMPLE 2

Three moisture-reduced pet food products are fed to dogs over a period of several days to determine palatability. The first product (Sample 1) is made up of moisture-reduced and coated pieces obtained according to the process described in example 1; the second product (Sample 2) is a mixture of the moisture-reduced and coated pieces and commercially available dried pellets in a ratio of 30:70; and the third product (Sample A) is made up of commercially available dried pellets.

The dogs are divided into two groups and each group is presented with a choice of two products. One group is presented with a choice of Sample 1 or Sample A and the other group is presented a choice of Sample 2 or Sample A. The amount of each product eaten is monitored.

The dogs prefer Samples 1 and 2 over Sample A in a ratio of 75:25. The results indicate that the moisture-reduced and coated pieces are highly palatable to dogs.

We claim:

1. A moisture-reduced, formulated food product comprising a fried body formed of layers of a thermally gelled matrix containing protein and starch.

2. A food product according to claim 1 which has a moisture content of about 5 to about 16% by weight.

3. A food product according to claim 1 which has a water activity of about 0.4 to about 0.8.

4. A food product according to claim 1 which includes a water-activity controlling agent selected from the group consisting of salts, sugars, and humectants.

5. A pet food comprising:
dried pieces of a thermally gelled matrix of a starch source and a protein source; and
pieces of a moisture-reduced, formulated food product, the product comprising a fried body formed of a thermally gelled matrix containing protein, starch and a water-activity controlling agent, the body having a moisture content of less than 16% by weight and a water activity of less than 0.9.

6. A pet food according to claim 5 in which the dried pieces and the formulated food product each have a water activity of about 0.4 to about 0.8.

7. A pet food product according to claim 5 wherein the water-activity controlling agent is selected from the group consisting of salts, sugars, and humectants.

8. A pet food according to claim 5 in which the body of the formulated food product comprises layers of a thermally gelled matrix containing the protein, the starch and the water-activity controlling agent.

9. A pet food according to claim 5 comprising about 10% to about 50% by weight of dried pieces.

10. A nutritionally balanced pet food comprising:
dried pieces of a thermally gelled matrix of a starch source and a protein source; and
pieces of a moisture-reduced, formulated food product, the product comprising a fried body formed of layers of a thermally gelled matrix containing protein, starch and a water-activity controlling agent, the body having a moisture content of less than 16% by weight and a water activity of less than 0.9.

11. A pet food according to claim 10 in which the dried pieces and the formulated food product each have a water activity of about 0.4 to about 0.8.

12. A pet food according to claim 10 wherein the water-activity controlling agent is selected from the group consisting of salts, sugars, and humectants.

13. A pet food according to claim 10 comprising about 10% to about 50% by weight of dried pieces.

14. A process for producing a moisture-reduced, formulated food product, the process comprising:
thermally gelling a protein source and a starch source for providing a thermally gelled matrix;
forming the thermally gelled matrix into pieces; and
frying the pieces for providing the moisture-reduced, formulated food product.

15. A process according to claim 14 further comprising forming the thermally gelled matrix into a layered, gelled matrix prior to forming the matrix into pieces.

16. A process according to claim 14 in which the thermally gelled matrix is formed into the layered, gelled matrix by heating the protein source and the starch source using mechanical energy in an emulsion mill and ejecting the heated mixture from the emulsion mill into a holding tube.

17. A process according to claim 14 further comprising incorporating a water-activity controlling agent into the thermally gelled matrix.

18. A process according to claim 14 further comprising coating a water-activity controlling agent onto the moisture-reduced, formulated food product.

19. A process according to claim 14 further comprising adding dried pieces of a thermally gelled matrix of a starch source and a protein source to the moisture-reduced, formulated food product.

20. A process according to claim 19 in which about 10% to about 50% by weight of dried pieces are added.

* * * * *